July 5, 1966   HIROKAZU OKAJIMA   3,259,039
OPHTHALMOSCOPIC CAMERA
Filed Aug. 29, 1963

INVENTOR.
HIROKAZU OKAJIMA
BY
ATTORNEY 3,259,039
OPHTHALMOSCOPIC CAMERA
Hirokazu Okajima, Ohta-ku, Tokyo, Japan, assignor to
Nippon Kogaku K.K., Chuo-ku, Tokyo, Japan, a corporation of Japan
Filed Aug. 29, 1963, Ser. No. 305,368
Claims priority, application Japan, Sept. 18, 1962,
37/40,157
5 Claims. (Cl. 95—1.1)

This invention relates to ophthalmic instruments, and more particularly to improvements in ophthalmoscopic camera by which the eye of a patient may be observed or photographed or simultaneously both observed and photographed.

The principal object of the invention is to provide such ophthalmoscopic camera that enables forming an image of the retinal surface of the patient on film for photographing at unvaried magnification and without flare, independently of the refractive properties, normal or abnormal, of the eye.

Efforts have been made in the past to meet the more exacting demands of the medical profession. To solve the problem of preventing unwanted aberrations and improving the quality of the image, the lens system disclosed in U.S. Patent 2,777,364, issued to A. E. Murray on January 15, 1957, was developed. There is also in the prior art an ophthmoscopic camera enabling photography at unvaried magnification disclosed in U.S. Patent 3,016,000, issued to K. Noyori on January 1, 1962. However, since eyes are measured in wide varying diopters, prior ophthalmoscopic cameras could not be, and were not liberated from being complicated in their optical systems.

In accordance with the present invention, an aperture stop is arranged at the back focal point of a second lens group, the opening of the aperture stop being selected in size to prevent light rays reflected by the cornea of the eye being observed or photographed, the second lens group and the aperture stop being moved as a unit along the optical axis according to the differing refraction condition of the eye, a film surface is fixed at the back focal point of a third lens group, whereby an image of a point on the retinal surface at the same view angle is always formed on the film surface at the same distance from the optical axis.

Figure 1:
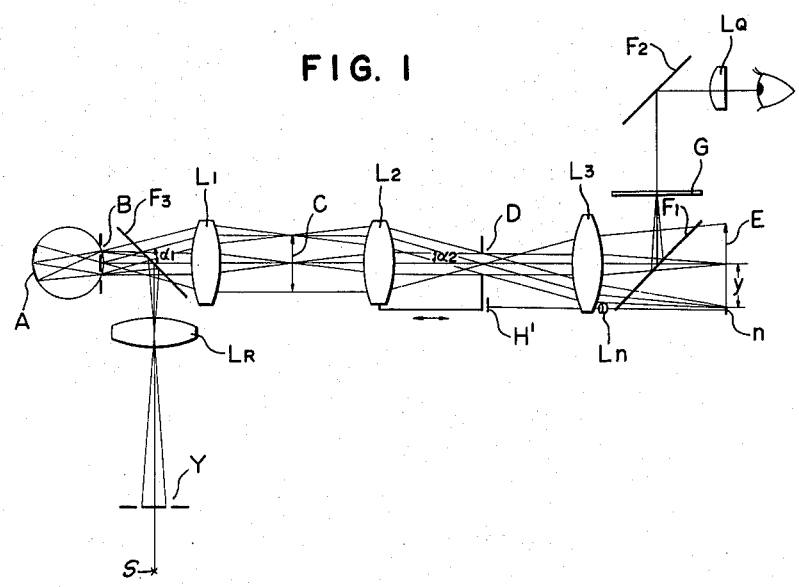
Figure 2:
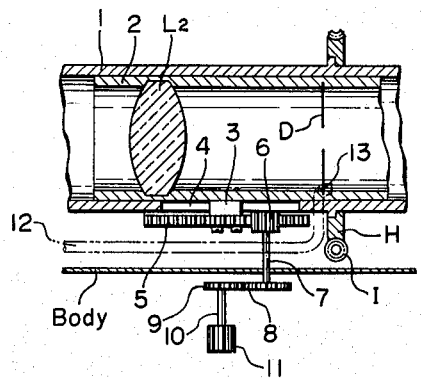

Further objects and advantages will be apparent in the various features described in the specification herebelow and shown in the accompanying drawing in which:

FIG. 1 is a schematic drawing of the photographic optical system of an ophthalmoscopic camera in accordance with the invention; and FIG. 2 is a schematic drawing showing one embodiment of the transfer mechanism for moving the second lens group and the aperture stop as a unit, and the rotative number plate for photographing a number identifying the patient being inspected.

Referring to the drawing, for the purpose of securing conjugate relationship between retina A and film surface E, the instant optical system comprises (1) an optical system of the eye to be inspected (hereinafter simply referred to as the eye) and first lens group $L_1$ having a focal length of $f_1$ is arranged to form an intermediary image C of retina A beyond first lens group $L_1$, (2) another optical system, comprising second lens group $L_2$ having a focal length of $f_2$, and (3), a third lens group $L_3$ having a focal length of $f_3$, arranged to form an image of intermediary image C on film surface E.

And in order to secure conjugate relationship between cornea B of the eye and aperture stop D which is positioned at the back focal plane of second lens group $L_2$, it is necessary to position cornea B, when operating the device, at front focal plane of first lens group $L_1$.

The position of the intermediary image C of retina A may move along the optical axis due to differences in the refractive condition of the eye, and in order to coincide in each case the front focal plane of second lens group $L_2$ with the position of intermediary image C, second lens $L_2$ and aperture stop D are moved in unison along the optical axis, by which movement the conjugate relationship between cornea B and aperture stop D is always maintained regardless of differing refractive conditions of eyes.

With the arrangement mentioned above, in which the relative positions of cornea B, first lens group $L_1$, third lens group $L_3$, and film surface E are spatially unchanged, while second lens group $L_2$ and aperture stop D are movable as a unit, it is always possible to correctly form on the film surface E the image of retina A even though the refractive conditions thereof may be variable.

When retina A is illuminated with the light from light source S passing through stop ring Y and condensing lens $L_R$, is reflected by half-mirror $F_3$, the so-called chief light ray from a point on retina A and passing through the centre of cornea B and making an angle of $\alpha$, with respect to the optical axis, will travel parallel to the axis in space beyond lens L, where the intermediary image C is formed and pass through the centre of aperture stop D at which it makes an angle of $\alpha_2$ to the optical axis. The relationship between angles $\alpha_1$ and $\alpha_2$ is expressed by the following equation:

$$\tan \alpha_2 = \left| \frac{f_1}{f_2} \cdot \tan \alpha_1 \right|$$

If it is so designed that the back focal plane of third lens group $L_3$ coincides with film surface E, height $y$, the distance from the optical axis of the point where the principal ray intersects the film surface, may be given by the following equation:

$$y = f_3 \cdot \tan \alpha_2 = \left| \frac{f_1 \cdot f_3}{f_2} \cdot \tan \alpha_1 \right|$$

This means that the photographic image of a point located on retina A of the eye and corresponding to a definite viewing angle $\alpha_1$ is formed on the film surface at a definite height. This is very convenient for the purpose especially of comparing and measuring retinas to be inspected.

When using the device, the cornea of the eye is located at position of B as aforementioned, and a part of the illuminating light rays reflected by the cornea will cause an undesirable flare when it enters into the ophthalmoscopic camera. To eliminate the flare, it is necessary, by utilizing a conjugate relationship between cornea B and aperture D, to intercept that portion of the light at aperture stop D which corresponds to an annular portion at cornea B through which illuminating light rays pass, thereby to determine the size of the opening of aperture stop D through which only such of the light rays as are reflected by the retina can be passed.

Since the magnification is constant in the system between cornea B and aperture stop D in order to satisfy the aforementioned condition for securing the conjugate relationship between cornea B and aperture stop D, and as the constructural condition for securing said conjugate relationship is independent of any difference in refractive conditions of the eye, there is no necessity to change the size of the opening of aperture stop D when second lens group $L_2$ and aperture stop D are moved as a unit.

A portion of the light rays which form the image of retina A on film surface E are reflected by half-mirror $f_1$, provided between third lens group $L_3$ and film surface E, to focus on focusing glass G having crossed lines on its surface, which in turn is observable by the inspector's eye through reflecting mirror $F_2$ and eyepiece $L_Q$.

Referring to FIG. 2, there is schematically shown one embodiment of the transfer mechanism of second lens group $L_2$ and aperture stop D. Within lens barrel 1 is slidably fitted frame 2, to the inner wall of which second lens group $L_2$ and aperture stop D are affixed at predetermined positions, frame 2 being movable within barrel 1 along the optical axis by the aid of projection 3 affixed to or integral with frame 2, an elongated longitudinal channel 4 in barrel 1 engaging and guiding projection 3.

Projection 3 is fixed to rack 5 meshing with pinion 6. Shaft 7 of pinion 6 extends beyond the camera body and gear 8 is mounted on one end of shaft 7. Gear 8 is engaged with gear 9 mounted on shaft 10, one end of shaft 10 carrying knob 11. When manually rotating knob 11, pin 3 together with frame 2 moves linearly along the optical axis through gears 9 and 8, pinion 6 and rack 5, thereby second lens group $L_2$ and aperture stop D would move in unison.

At the position adjacent to the back surface of aperture stop D and around the periphery of lens barrel 1 is provided worm wheel H preferably made of a transparent material and which is engaged with worm I rotatable by the aid of knob provided outside the camera body (not shown). On the surface of worm wheel H a plurality of number plates are concentrically arranged in a predetermined spaced relation with each other. The radial position of plate numbers is shown in FIG. 1 as H' and this position is selected not to interfere with the light rays of retina A to be inspected.

A part of light rays introduced from light source S is shared and guided through tubing 12 to illuminate a number engraved or printed on a number plate, and through lens $L_n$ the image of the number is observed, or photographed on film surface E, just below the image of retina A.

A number should be assigned to a specific patient, and when another patient be inspected another number would be assigned to such other patient by turning worm wheel H through one frame.

In accordance with the invention, images of retinas of constant magnification are obtained without flare, irrespective of differing refractive conditions of different eyes. The construction of the ophthalmoscopic camera of the invention is very simple and yet the image obtained is very excellent. Photography can be had over a wide range of diopters such as, for example, between plus 20 diopters and minus 35 diopters, and the image to be observed or photographed is very clear and sharp even in the peripheral portion thereof.

The ophthalmoscopic optical system according to the invention may be housed in a compact case which can be hand-operated by the inspector.

What I claim is:

1. An ophthalmoscopic instrument comprising a first, a second and a third lens group arranged on a common optical axis, the second lens group being movable axially relative to the first lens group to position the image formed by the first lens group in combination with the optical system of the eye being examined of the retina of such eye, the position of which image is variable in dependence on the refractive conditions of such eye, coincident on the front focal plane of the second lens group to provide for the third lens group an object at infinity, means for illuminating the retina of such eye through an annular portion of the cornea of such eye with the cornea positioned at the front focus of the first lens group, and an axially apertured stop at the rear focal plane of the second lens group and movable in unison therewith, the aperture size being so limited that with the cornea so positioned an image of said annular portion of the cornea is formed on the stop surrounding the cornea.

2. An instrument according to claim 1 in which the spacing between the first and third lens groups is fixed.

3. An instrument according to claim 1 having camera means for photographing the so positioned cornea, of which camera means the camera film plane is coincident with the rear focal plane of the third lens group.

4. An instrument according to claim 3 in which a semi-reflecting mirror is disposed obliquely behind the third lens group, a focusing screen positioned to have an image focused on the screen by reflection from the semi-reflecting mirror simultaneously with the focussing of an identical image in the film plane, and means for observing the focussing screen during adjustment of the position of the second lens group.

5. An instrument according to claim 4 having a series of index marks, means for selecting any mark of the series, and means for projecting and focussing an image of the selected mark adjacent the retinal image formed in the focal plane of the third lens group.

References Cited by the Examiner
UNITED STATES PATENTS

| | | | |
|---|---|---|---|
| 2,339,657 | 1/1944 | Smith | 95—1.1 X |
| 2,902,911 | 9/1959 | Noyori | 95—11 |
| 3,036,568 | 5/1962 | Stark | 95—11 X |

JOHN M. HORAN, *Primary Examiner.*